United States Patent [19]
Hohensee et al.

[11] Patent Number: 6,067,554
[45] Date of Patent: May 23, 2000

[54] METHOD AND APPARATUS FOR DISPLAYING PRINT DOCUMENTS

[75] Inventors: Reinhard H. Hohensee; Jamsie Treppendahl, both of Boulder; David R. Tanigawa, Broomfield; Gregory S. Felderman, Westminster; Roger L. Buis, Longmont; Brian E. Haan, Boulder, all of Colo.

[73] Assignee: International Business Machines Corp., Armonk, N.Y.

[21] Appl. No.: 08/927,769

[22] Filed: Sep. 11, 1997

[51] Int. Cl.[7] .............................. G06F 15/00; G06F 15/20

[52] U.S. Cl. .......................................... 707/527; 707/526

[58] Field of Search ................................ 707/527, 526, 707/500, 530; 395/117, 106, 111, 101, 109; 345/112, 113, 116, 156

[56] References Cited

U.S. PATENT DOCUMENTS

| | | |
|---|---|---|
| 4,649,513 | 3/1987 | Martin et al. ............................ 364/900 |
| 4,951,233 | 8/1990 | Fujiwara et al. ........................ 364/523 |
| 5,495,561 | 2/1996 | Holt . |
| 5,640,580 | 6/1997 | Slayden et al. ......................... 395/789 |
| 5,768,488 | 6/1998 | Stone et al. . |

*Primary Examiner*—Joseph H. Feild
*Assistant Examiner*—Alford W. Kindred
*Attorney, Agent, or Firm*—Kudirka & Jobse, LLP

[57] ABSTRACT

A method and apparatus for displaying, on a display device, a selected page from a print document inserts formatting parameters at the beginning of each page in the data stream representing the print document. The apparatus and method further locate a specified page in the print document, and then display the specified page utilizing the formatting parameters at the beginning of the page. There is no need to process the entire document in a manner similar to that used for printing since each page includes the formatting parameters.

15 Claims, 6 Drawing Sheets

METHOD AND APPARATUS FOR DISPLAYING PRINT DOCUMENTS

FIELD OF THE INVENTION

This invention relates generally to computer systems having printers and display devices and, more particularly, to displaying final form print documents on a display device.

BACKGROUND OF THE INVENTION

Figure 1:
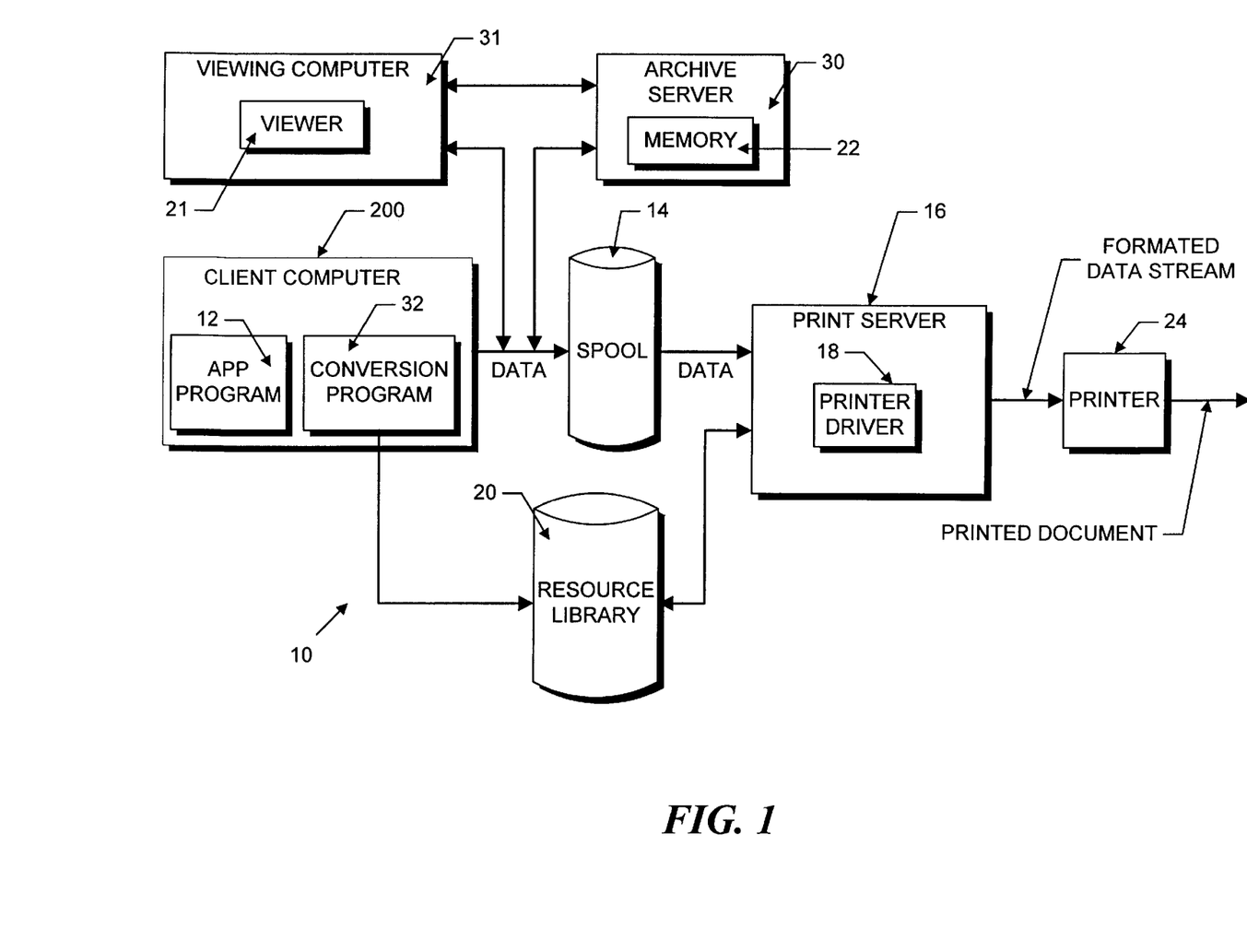
FIG. 1 is a schematic drawing of an Advanced Function Presentation system for printing a document produced by an application program.

FIG. 1 shows a conventional "Advanced Function Presentation" (AFP) printing system 10 for printing a document produced by an application program 12 (i.e., a "print document") on a client computer 200. The client computer 200 may be a conventional personal computer, such as an IBM THINKPAD 701® computer, available from International Business Machines Corporation of Armonk, N.Y. The application program 12 running on the computer 200 generates a data stream that is a formatted, platform and device independent logical description of the print document. One known specification of such a logical description of a data stream utilized for printing is known as MO:DCA™ (Mixed Object Document Architecture), described in detail in I.B.M. Mixed Object Document Architecture Reference number SC31-6802.

The printing system 10 includes a spool 14 for both receiving and spooling the data stream representing the print document from the application program 12. Once received by the spool 14, the data stream is transmitted to a print server 16 that converts the data stream to a device specific data stream by means of a printer driver 18, and a resource library 20 having print control functions. Use of the resource library 20 in this manner is known in the art as "outboard formatting." The resource library 20 is utilized in this manner to tie the logical page description of the print document to a physical medium. Once the data stream is formatted, it is directed to a printer 24 for producing a printed document.

In addition to being formatted for printing on the physical medium, however, the data stream generated by application 12 may also be forwarded and stored (archived) in memory 22 of an archive server 30 for printing at a later date.

Print documents include one or more pages. For example, a telephone company may print all of its telephone bills for a specified week as a single print document. Each page in the telephone company print document may be telephone bills for different customers.

Pages in a print document may have one or more associated "overlays," which are static templates to which the page information is added. Continuing with the telephone company example, an overlay for the telephone bills may be the background of the telephone bill having the company logo, and columns for listing the telephone numbers called. Overlays typically are stored in the resource library 20 and utilized by the printer server 16, when processing the data stream, to produce the printed document.

Below is a generalized representation of a data stream for a two page print document in the MO:DCA format:

```
           BDT
               Invoke Medium Map X
               BPG1
                 .
                 .
                 .
               EPG1
```

```
               BPG2
                 .
                 .
                 .
               EPG2
           EDT
```

The document includes a Begin Document structured field (BDT) for marking the beginning of the print document, and an End Document structured field (EDT) for marking the end of the document. Similarly, the two pages each have a Begin Page structured field (BPG) for marking the beginning of each page, and an End Page structured field (EPG) for marking the end of each page. The data stream also includes an "Invoke Medium Map X" structured field, which in the AFP print system 10 causes the print server 16 to direct a call to a Medium Map (discussed below) labeled "X" in the resource library 20.

A plurality of Medium Maps are stored in the resource library 20. Medium Maps include certain formatting information for formatting the pages in the data stream to form the printed sheet. Such information may include printing commands that determine, for example, whether the page is on the front side of a sheet of paper or the back side of a sheet of paper, and from which input bin on the printer 24 to draw paper. Medium Maps also include Page Position (PGP) structured fields with one or more repeating groups (discussed below), which include additional formatting information. Each time the print server 16 reads an Invoke Medium Map structured field in the data stream, the formatting information associated with that Medium Map is used for each succeeding page in the print document until either another Medium Map is invoked, or the end of the print document is reached. For example, a print document with nine hundred pages can have a single Medium Map that is used to format the entire document. Conversely, a second Medium Map may be Invoked after any page in that print document such as, for example, at page four hundred.

Repeating groups in PGP structured fields are utilized to position multiple pages in a print document on different "partitions" of a single sheet of paper. More particularly, the sheet of paper is divided into partitions that may include one or more pages of the print document when the sheet is printed. The number of repeating groups in a Medium Map is equal to the number of pages to be printed on a single sheet of paper. For example, an N-up printing scheme printing eight pages on a single piece of paper (discussed in detail in U.S. Pat. No. 5,495,561 to Holt, incorporated herein by reference) has eight repeating groups. Each of the eight repeating groups positions one of the eight pages on the single sheet of paper. The repeating groups each position the pages by specifying information such as the degree of rotation of the page, whether there are overlays to be used with the page, the name of the overlays, which sheet partition to use for positioning and where to position the page on the partition.

When a data stream is processed for printing by the print server 16, a Medium Map is invoked and the PGP repeating groups in that Medium Map successively position each page in the data stream on specified sheets of paper. For example, in a Medium Map for a 3-up simplex format (which has three pages on one side of a single sheet of paper and thus, three repeating groups), the first repeating group positions the first page in the document, the second repeating group positions the second page in the document, and the third repeating group positions the third page in the document. The first repeating group then positions the fourth page, the second repeating group positions the fifth page, etc . . . until the end of document is reached or another Invoke Medium Map structured field is read in the data stream. If a new Invoke Medium Map structured field is read, then the repeating groups in that new Medium Map are utilized for positioning the pages succeeding that invoke structured field until, similarly, either the end of the document is reached, or yet another Invoke Medium Map structured field is read.

After a print document is printed, the print data stream that was sent to the printer may be archived for later printing. It often is desirable to view the archived print data stream in a format identical to the print document, as originally printed in its final form, on a display device. This may be done by configuring a viewing program (viewer) to sequentially read and process the archived data stream in a manner similar to that used when processing the page for printing. This viewing approach is not practical, however, when indexing directly to a single page in a large document. For example, it would take a relatively long time to sequentially go through the noted printing process to view page one-thousand-five hundred in a two thousand page document. Such slow process nevertheless is necessary to determine which Medium Map and which PGP repeating group is associated with the indexed page.

Accordingly, it would be desirable to have a method and apparatus that enables a user to rapidly and efficiently display a final form print document on a display device.

SUMMARY OF THE INVENTION

In accordance with one aspect of the invention, an apparatus for displaying, on a display device, a selected page from a print document includes a mechanism for inserting formatting parameters at the beginning of each page in the data stream representing the print document. The apparatus further includes a mechanism for locating a specified page in the print document, and then displaying the specified page utilizing the formatting parameters at the beginning of the page. There is no need to process the entire document in a manner similar to that used for printing since each page includes the formatting parameters.

In accordance with another aspect of the invention, the formatting parameter may be a reference to one or more overlays to be displayed with the selected page.

In accordance with yet another aspect of the invention, the formatting parameter may be a display flag for indicating whether the selected page can be displayed. When the display flag is read by a viewer, the viewer will not display the page on the display device.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 2:
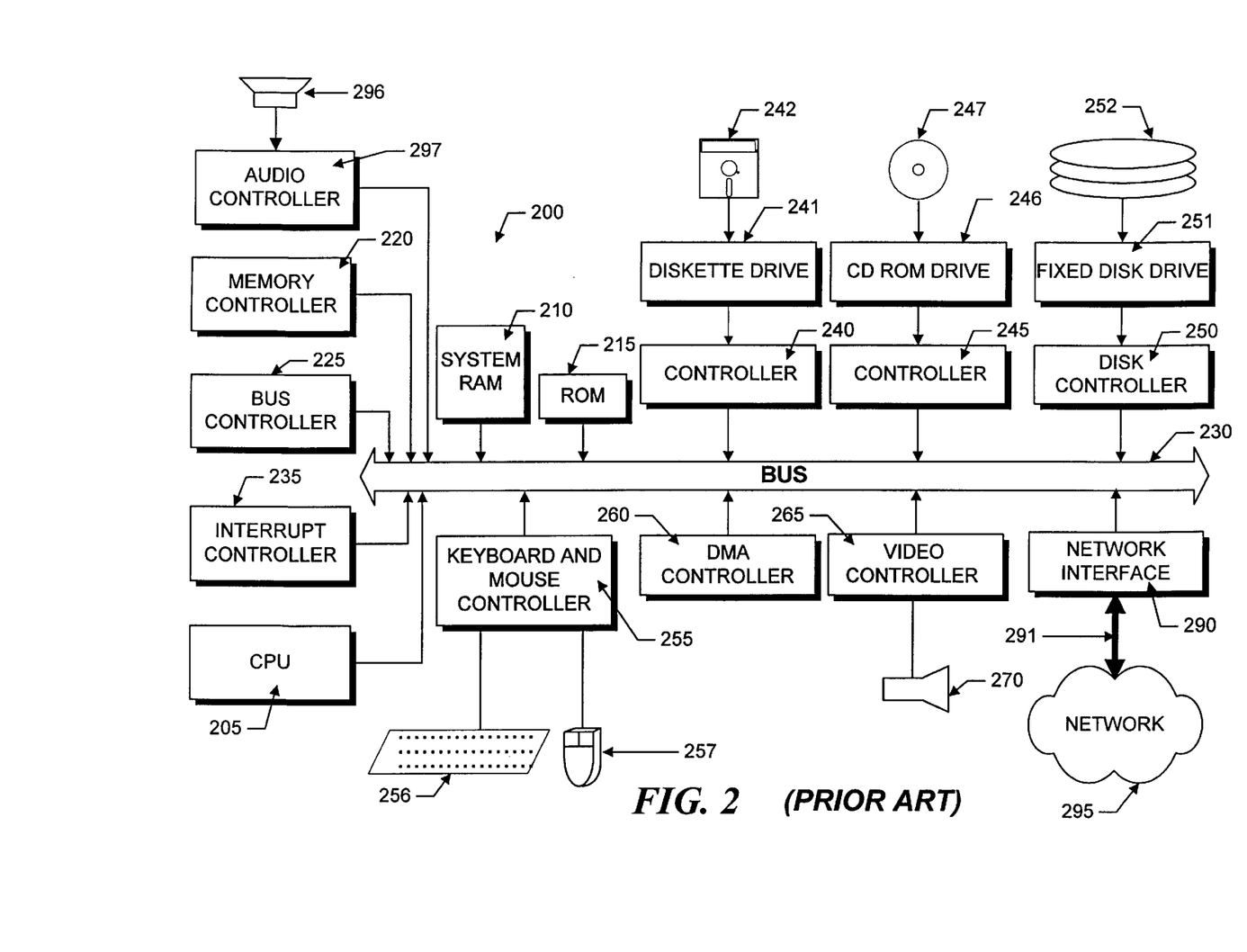
FIG. 2 illustrates the system architecture for an exemplary computer system on which the preferred embodiment of the invention can be implemented.

FIG. 2 illustrates the system architecture for an exemplary computer system, such as system 31 or 200, which may illustratively be IBM THINKPAD 701® computer, on which the preferred embodiment of the invention can be implemented. The exemplary computer system of FIG. 2 is discussed only for descriptive purposes, however, and should not be considered a limitation of the invention. Although the description below may refer to terms commonly used in describing particular computer systems, such as an IBM THINKPAD 701® computer, the described concepts apply equally to other computer systems, including systems having architectures that are dissimilar to that shown in FIG. 2.

The computer 200 includes a central processing unit (CPU) 205, which may include a conventional microprocessor, random access memory (RAM) 270 for temporary storage of information, and read only memory (ROM) 215 for permanent storage of information A bus controller 225 is provided for controlling bus 230, and an interrupt controller 235 is used for receiving and processing various interrupt signals from the other system components.

Mass storage may be provided by diskette 242, CD-ROM 247, or hard disk 252. Data and software may be exchanged with computer 200 via removable media, such as diskette 242 and CD-ROM 247. Diskette 242 is insertable into diskette drive 241, which is connected to bus 230 by controller 240. Similarly, CD-ROM 247 is insertable into CD-ROM drive 246, which is connected to bus 230 by controller 245. Finally, the hard disk 252 is part of a fixed disk drive 251, which is connected to bus 230 by controller 250.

User input to the computer 200 may be provided by a number of devices. For example, a keyboard 256 and a mouse 257 may be connected to bus 230 by keyboard and mouse controller 255. An audio transducer 296, which may act as both a microphone and a speaker, is connected to bus 230 by audio controller 297. It should be obvious to those reasonably skilled in the art that other input devices, such as a pen and/or tablet and a microphone for voice input, may be connected to computer 200 through bus 230 and an appropriate controller. DMA controller 260 is provided for performing direct memory access to system RAM 210. A visual display is generated by a video controller 265, which controls video display 270.

Computer system 200 generally is controlled and coordinated by operating system software, such as the WINDOWS 95® or WINDOWS NT® operating systems (available from Microsoft Corp., Redmond, Wash.) or the AIX® operating system (available from International Business Machines Corporation, Armonk, N.Y.) Among other computer system control functions, the operating system controls allocation of system resources and performs tasks such as process scheduling, memory management, networking and I/O services.

Computer 200 also includes a network adapter 290 that allows the computer 200 to be interconnected to a network 295 via a bus 291. The network 295 may be a local area network (LAN), a wide area network (WAN), or the Internet.

The client computer 200 may be a part of the print system 10 shown in FIG. 1. The print system 10 shown in FIG. 1 shall be used herein to describe a preferred embodiment of the invention.

In the preferred embodiment of the invention, a user may rapidly and efficiently display an archived final form print document on the display device 270 of the client viewing computer 31. It should be noted that although specific types of printing formats are discussed (e.g., MO:DCA and N-up printing) when describing the invention, such formats are for descriptive purposes only and should not be considered a limitation of the invention.

Figure 3:
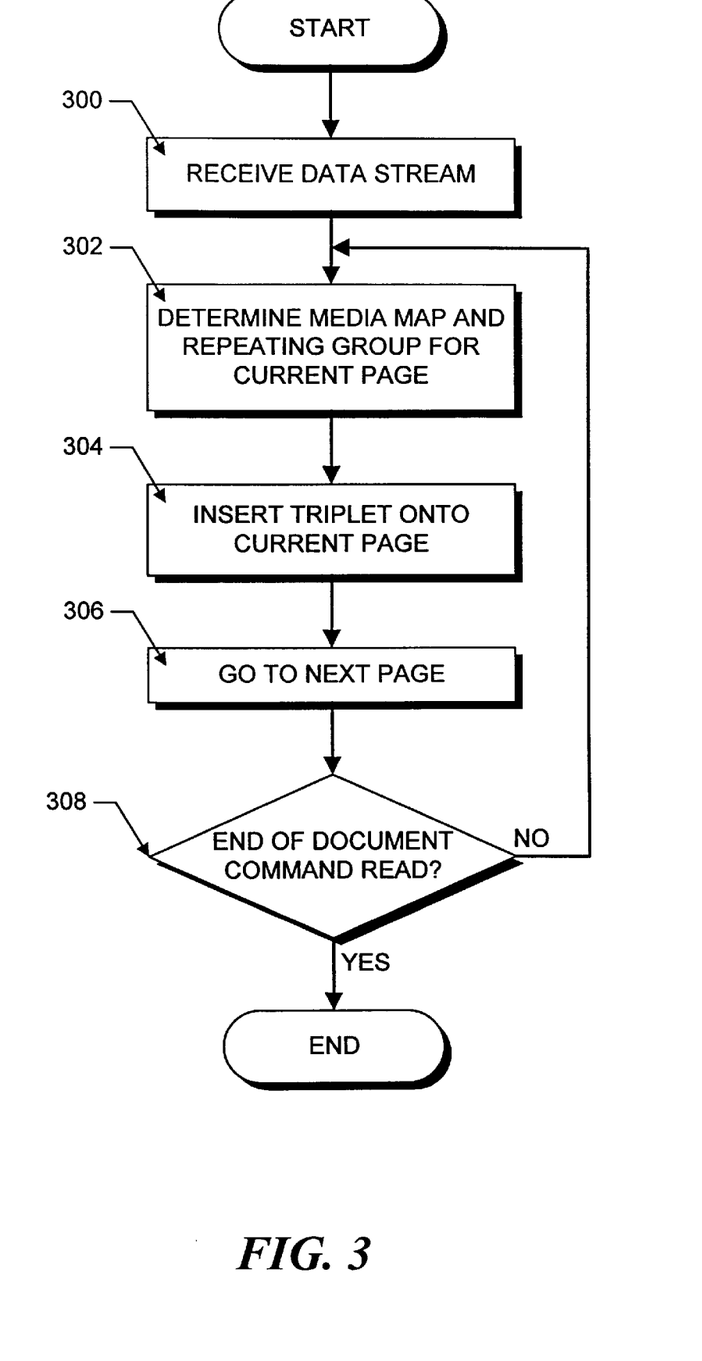
FIG. 3 is a flow chart generally showing the steps for initializing a data stream for display on a display device.

FIG. 3 is a flow chart generally showing the steps used by a conversion program 32 (on the computer 200 or other computer) for enhancing a data stream representing a print document to allow page independent representation on displays, printers or other output devices. This process adds formatting information directly to the data stream to enable a viewing program (viewer 21), running on a viewing computer 31, to display a selected page of the print document on a display device. When displayed by the viewer 21, selected pages of the print document can be displayed in a form that is identical to the form in which such pages were printed on a sheet of paper.

The process begins at step 300 in which the data stream is received by the converter program 32 (FIG. 1). A current page variable then is set to the first page in the document. The first page is located by locating the first Begin Page structured field in the document. Once the first page is located, it is determined which Medium Map and PGP repeating group are used to format the current page (step 302). The associated Medium Map and repeating group for the current page may be determined by conventional means, such as by stepping through the data stream in a manner similar to that when the data stream is being printed. At step 304, a viewer triplet is inserted directly into the Begin Page structured field. The viewer triplet, which is a data structure for carrying information in the data stream, includes a reference to the Medium Map and repeating group for the current page. It should be noted that the data stream may include other types of triplets such as, for example, triplets that facilitate printing. Alternatively, a first triplet may be inserted to include a reference to the Medium Map, and a second triplet may be inserted to include a reference to the PGP repeating group. It should be noted, however, that triplets can contain any formatting information in accordance with the invention such as, for example, a pointer to a Medium Map in the resource library 20, or the actual Medium Map information.

At step 306, the next page is examined. The process ends if the End Document structured field is read instead of another Begin Page structured field (step 308). In such case, each of the pages in the print document includes associated Medium Map and repeating group information. The print document then may be stored (i.e., archived) in memory 22 of the archive server 30 for either printing or viewing at a later date. If at step 308, however, the End Document structured field is not read, the process loops back to step 302 and continues until the End Document structured field is read.

Figure 4:
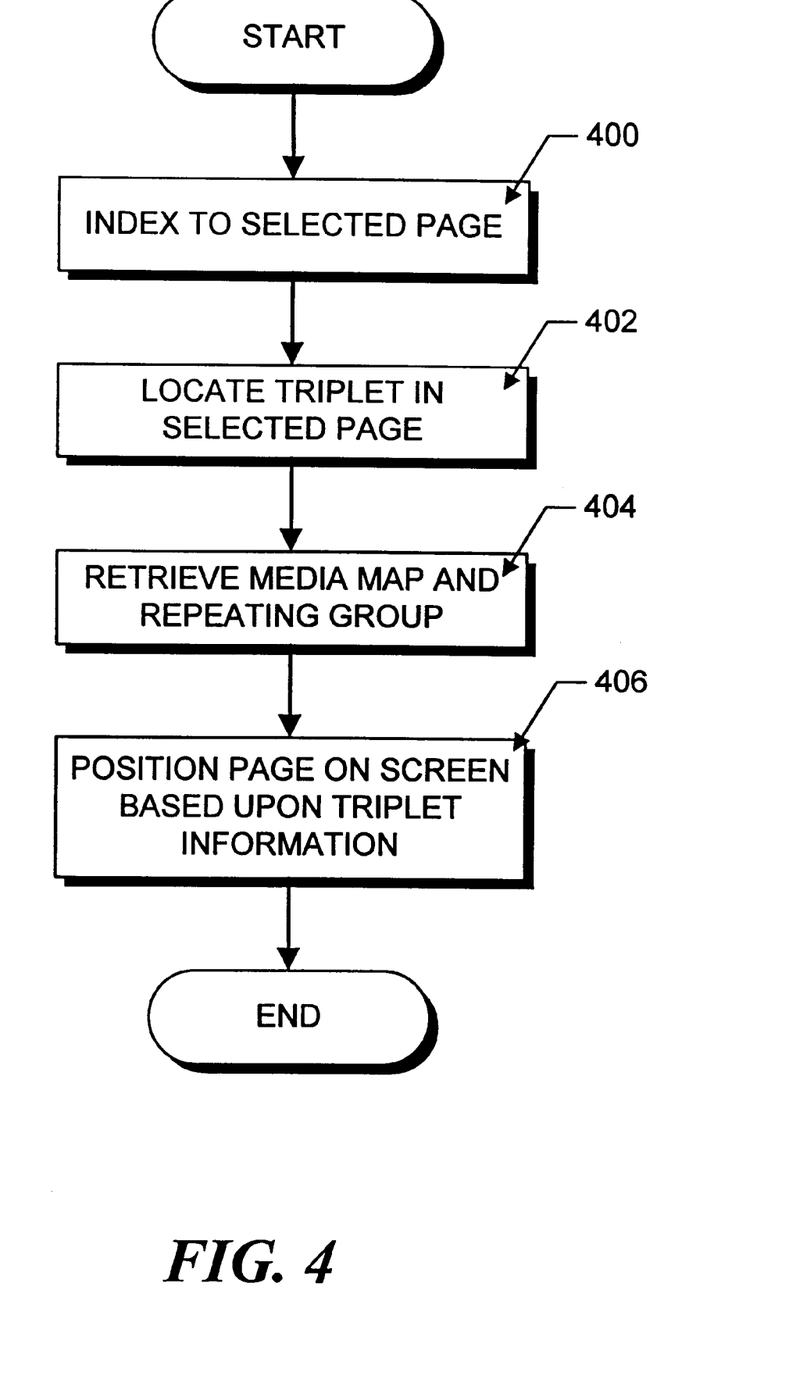
FIG. 4 is a flow chart generally showing the process for displaying a selected page in a print document.

Once the print document is completely initialized with Medium Map and repeating group information, a user may index directly to any selected page in the archived print document for display on the display device 270 or representation on other output devices. FIG. 4 is a flow chart generally showing the process used by the viewer 21 for displaying a selected page in the print document. The process begins at step 400 where a user indexes to the selected page. Any known indexing mechanism may be used. At step 402, the viewer triplet is located within the Begin Page structured field for the selected page. Based upon the information in the viewer triplet, the viewer 21 retrieves the Medium Map and repeating group formatting information from the resource library 20 (step 404) for the selected page. Once such formatting information is retrieved, the viewer 21 positions and displays the selected page on the screen of the display device 270 (step 406). Accordingly, this method and apparatus provides the Medium Map and PGP repeating group information directly within each page, thereby eliminating the need to sequentially process each preceding page in a print document.

Once the triplet is read, the viewer 21 retrieves the appropriate Medium Map and repeating group in the resource library 20 to format the selected page. Information in the Medium Map may specify whether the document is to be printed in simplex format (one or more pages on a single side of a sheet of paper) or in duplex format (one or more pages on both sides of a sheet of paper), and which input bin on the printer 24 that the sheet of paper is to be drawn. The Medium Map also includes the repeating group information for the selected page. The repeating group information may include a reference to one or more overlays in the resource library 20 that are to be used on the page, whether the page is in N-up format, how the page is to be rotated, and the position of the page on the print medium (e.g., a sheet of paper).

Figure 5:
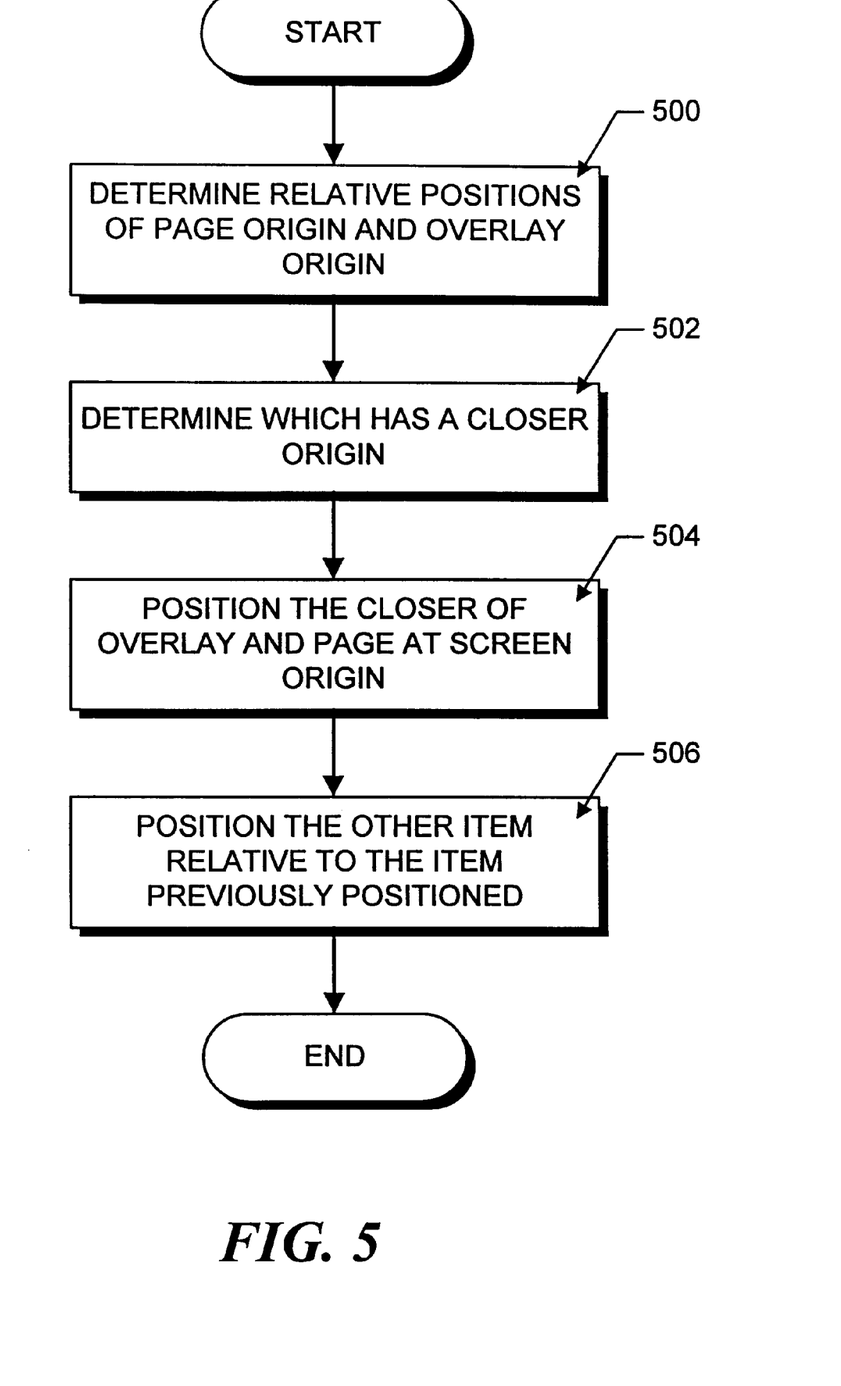
FIG. 5 is a flow chart generally showing the process for positioning a selected page in a print document on a display device.

As noted in step 404, the information in the viewer triplet is utilized to position the selected page on the screen of the display device 270. FIG. 5 is a flow chart generally showing the process of positioning the selected page on the screen relative to an accompanying overlay. In the preferred embodiment of the invention, the selected page is in the N-up format and the overlay is a "page modification control" (PMC) overlay, which can be created with products from International Business Machines Corporation. A PMC overlay, which is stored in the resource library 20, is positioned on the print medium relative to the "origin" of the selected page, or relative to the N-up partition into which a page is to be positioned. The origin is defined as the upper left corner of a page, overlay, partition, or screen.

The process begins at step 500 where the relative positions, when printed, of the page origin and its associated overlay origin are determined. At step 502, it is determined which item (i.e., the page or its associated overlay) has an origin that is closer in distance to the origin of the partition that would include the page if such page were printed. The item with the closer origin then is positioned at the screen origin at step 504. At step 506, the item not having the closer origin is positioned relative to the item that was first positioned, thus properly positioning the page and overlay on the screen and completing the process. By utilizing this process, the page and overlay have the same relative position on the screen as on the printed page.

The process shown in FIG. 5 also may be utilized when multiple overlays are used with a page. Specifically, it first is determined which overlay has an origin closest to the partition origin for the page. That overlay then is compared to the origin of the page and positioned in accordance with steps 504 and 506. The remaining overlays are subsequently positioned on the screen relative to the page origin.

Figure 6:
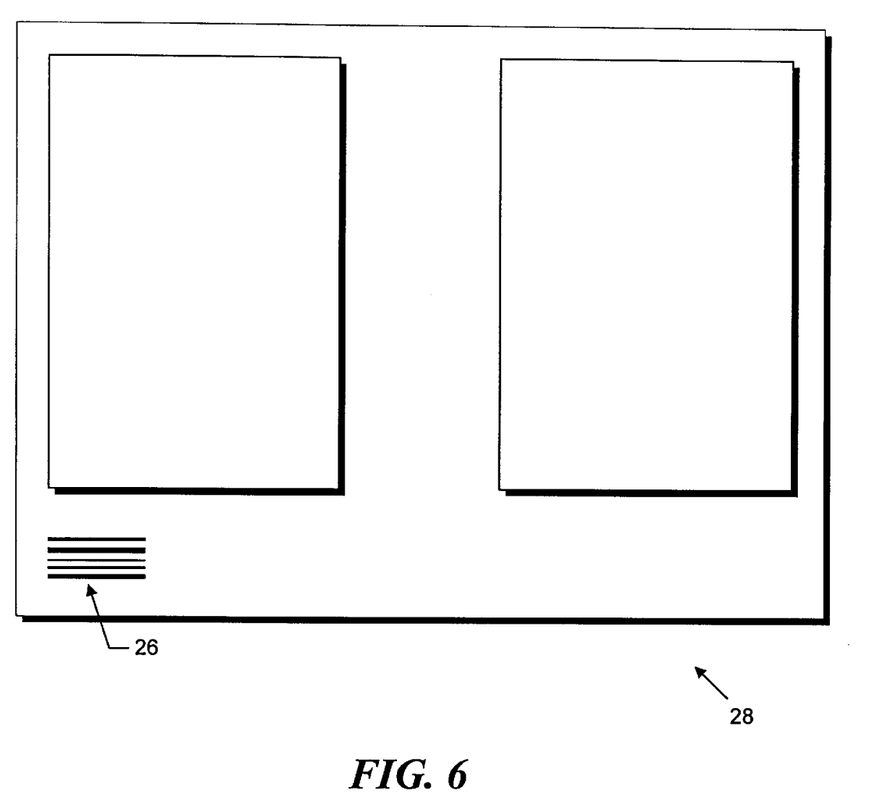
FIG. 6 is a schematic drawing of a sheet of paper printing a document in 3-up format where one of the pages is a bar code.

Frequently, many pages in a print document are not in a format that is useful to a user when displayed on the display device 270. For example, as shown in FIG. 6, a page on a sheet of paper 28 may be in the form of a bar code 26 that specifies to a cutting device 1) that the sheet of paper 28 with the bar code 26 is printed in N-up format, and 2) how such sheet 28 is to be cut. The bar code 26 in the sheet 28 shown in FIG. 6, for example, may specify that the sheet is in 3-up simplex format, and that such sheet 28 should be cut in half after the bar code 26 is cut from the sheet of paper 28. After the bar code is scanned, the cutting device consequently should cut the lower part of the sheet of paper 28 to remove the bar code 26, and then cut the remainder of the sheet 28 in half.

Accordingly, the repeating groups may include a display flag to specify whether or not a selected page is to be displayed by the viewer 21. In the preferred embodiment, the display flag is a single bit that displays the selected page if the flag bit is set to logical "0", and does not display the selected page if the flag bit is set to logical "1."

Once a data stream is formatted, it may be either printed by the print server 16, or displayed by the viewer 21. Viewer triplets added to the data stream of a print document in accordance with the process shown in FIG. 3, however, are ignored by a printing program (in the print server 16) when the print document is printed. More particularly, the printing program checks an identifier in each triplet in the data stream when the print document is being printed. Triplets are used by the printing program for printing the page only when the printing program recognizes the identifier in a triplet. For example, the printing program will recognize the identifier in print triplets and consequently utilize the accompanying information for printing the data stream. The viewer triplets added to the data stream by the inventive process, however, have an identifier that is recognized by the viewer 21 only and not by the printing program in the print server 16. Accordingly, such viewer triplets are completely ignored by the print server 16 during printing and thus, do not interfere with printing.

In an alternative embodiment, the invention may be implemented as a computer program product for use with a computer system. Such implementation may include a series of computer instructions fixed either on a tangible medium, such as a computer readable media (e.g., diskette 242, CD-ROM 247, ROM 215, or fixed disk 252 as shown in FIG. 2) or transmittable to a computer system, via a modem or other interface device, such as communications adapter 290 connected to the network 295 over a medium 291. Medium 291 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 295 (e.g., the Internet or World Wide Web).

Although various exemplary embodiments of the invention have been disclosed, it will be apparent to those skilled in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A method of displaying on a display device having a display origin a selected page, having a page origin and adapted to be positioned relative to a partition origin, from a plurality of pages stored in the memory of a computer, the plurality of pages being stored in the form of a data stream having a plurality of data stream segments, the plurality of data stream segments including a selected segment representing the selected page data, the page being formatted, when printed, by formatting information in a format file, the method comprising the steps of:

A. inserting at least some of the formatting information associated with the selected page into the selected segment to create a formatted selected segment;

B. locating the formatted selected segment in the data stream;

C. reading the located formatted selected segment; and

D. utilizing the formatting information inserted into the formatted selected segment to display the selected page on the display device by means of the steps comprising:

D1. locating the formatting parameters in the selected segment, the formatting information including overlay information and information relating to whether the page is in N-up format;

D2. ascertaining, from the format parameters, if the page is in N-up format and if the page includes an overlay, the overlay having an overlay origin;

D3. determining the position of the overlay origin relative to the page origin; and D4. aligning with the display origin, if the page is in N-up format and includes an overlay, the closer of the overlay origin and the page origin to the partition origin.

2. The method as defined by claim 1 wherein the inserted formatting information is a reference to an overlay.

3. The method as defined by claim 1 wherein the inserted formatting information is a display flag, the method further including the step of:

E. preventing the selected page from being displayed on the display device when the display flag is set to a preselected state.

4. The method as defined by claim 1 wherein the selected segment includes a Begin Page structured field, step A comprising the step of:

A1. inserting the formatting information into the Begin Page structured field.

5. The method as defined by claim 1 wherein the format file includes a Medium Map.

6. An apparatus for displaying on a display device having a display origin a selected page, having a page origin and adapted to be positioned relative to a partition origin, from a plurality of pages stored in the memory of a computer, the plurality of pages being in the form of a data stream having a plurality of data stream segments, the plurality of data stream segments including a selected segment representing the selected page data, the page being formatted, when printed, by formatting information in a format file, the apparatus comprising:

means for inserting at least some of the formatting information associated with the selected page into the selected segment to create a formatted selected segment;

means for locating the formatted selected segment in the data stream;

means for reading the located formatted selected segment; and means for utilizing the formatting information inserted into the formatted selected segment to display the selected page on the display device, the utilizing means comprising:

means for locating the formatting information in the selected segment, the formatting information including overlay information and information relating to whether the page is in N-up format;

means for ascertaining, from the format parameters, if the page is in N-up format and if the page includes an overlay, the overlay having an overlay origin;

means for determining the position of the overlay origin relative to the page origin; and     means for aligning with the display origin, if the page is in N-up format and includes an overlay, the closer of the overlay origin and the page origin to the partition origin.

7. The apparatus as defined by claim 6 wherein the inserted formatting information is a reference to an overlay.

8. The apparatus as defined by claim 6 wherein the inserted formatting information is a display flag, the apparatus further including:

means for preventing the selected page from being displayed on the display device when the display flag is set to a preselected high or low state.

9. The apparatus as defined by claim 6 wherein the selected segment includes a Begin Page structured field, the inserting means comprising:

means for inserting the formatting information into the Begin Page structured field.

10. The apparatus as defined by claim 6 wherein the format file includes a Medium Map.

11. A computer program product comprising a computer usable medium having computer readable program code thereon for displaying on a display device having a display origin a selected page, having a page origin and adapted to be positioned relative to a partition origin, from a plurality of pages stored in the memory of a computer, the plurality of pages being in the form of a data stream having a plurality of data stream segments, the plurality of data stream segments including a selected segment representing the selected page data, the page being formatted, when printed, by formatting information in a format file, the program code including:

program code for inserting at least some of the formatting information associated with the selected page into the selected segment to create a formatted selected segment;

program code for locating the formatted selected segment in the data stream;

program code for reading the located formatted selected segment; and program code for utilizing the formatting information inserted into the formatted selected segment to display the selected page on the display device, the program code for utilizing comprising:

program code for locating the formatting information in the selected segment, the formatting information including overlay information and information relating to whether the page is in N-up format;

program code for ascertaining, from the formatting information, if the page is in N-up format and if the page includes an overlay, the overlay having an overlay origin;

program code for determining the position of the overlay origin relative to the page origin; and     program code for aligning with the display origin, if the page is in N-up format and includes an overlay, the closer of the overlay origin and the page origin to the partition origin.

12. The computer program product as defined by claim 11 wherein the inserted formatting information is a reference to an overlay.

13. The computer program product as defined by claim 11 wherein the inserted formatting information is a display flag, the computer program product further comprising:

program code for preventing the selected page from being displayed on the display device when the display flag is set to a preselected high or low state.

14. The computer program product as defined by claim 11 wherein the selected segment includes a Begin Page structured field, the program code for inserting comprising:

program code for inserting the formatting parameters into the Begin Page structured field.

15. The computer program product as defined by claim 11 wherein the format file includes a Medium Map.

\* \* \* \* \*